United States Patent [19]

Polic

[11] Patent Number: 4,989,855
[45] Date of Patent: Feb. 5, 1991

[54] DEVICE FOR POSITIONING PLATE-SHAPED PIECES DURING THEIR TRANSFER INTO A PROCESSING MACHINE

[75] Inventor: Georges Polic, Prilly, Switzerland

[73] Assignee: Bobst SA, Lausanne, Switzerland

[21] Appl. No.: 352,369

[22] Filed: May 16, 1989

[30] Foreign Application Priority Data

May 19, 1988 [CH] Switzerland .................. 01909/88

[51] Int. Cl.⁵ .............................................. B65H 7/08
[52] U.S. Cl. ..................................... 271/227; 271/236
[58] Field of Search ................. 358/101; 271/227, 236, 271/245, 253, 254, 255

[56] References Cited

U.S. PATENT DOCUMENTS

| | | | |
|---|---|---|---|
| 4,677,474 | 6/1987 | Sato | 358/101 |
| 4,680,627 | 7/1987 | Sase | 358/101 |
| 4,849,914 | 7/1989 | Medioni | 358/101 X |

Primary Examiner—Richard A. Schacher
Attorney, Agent, or Firm—Hill, Van Santen, Steadman & Simpson

[57] ABSTRACT

A device which includes a camera arranged above a feed table to simultaneously scan a front edge and a lateral edge of a plate-shaped piece or sheet having a printed area adjacent the edges of the sheet characterized by transmitting an output of the camera to a signal processor and calculating unit to compare the output of the camera to a reference signal to create error signals which are used to operate motors for moving the lateral stops and front stops in accordance with the amount of error signals to correct misalignment of the sheet.

10 Claims, 5 Drawing Sheets

DEVICE FOR POSITIONING PLATE-SHAPED PIECES DURING THEIR TRANSFER INTO A PROCESSING MACHINE

BACKGROUND OF THE INVENTION

The present invention is directed to a device for positioned plate-shaped pieces such as a board or paper sheet within a processing machine and especially within a positioning device during the pieces travel on the machine feed table so that the sheet is aligned against the front and side stops by means of conveying devices such as rollers or elastic belts before the sheet or board is carried into the carrier such as grippers which are fitted on cross bars and are themselves permanently mounted on an endless chain of the processing machine. Generally, such a feed table is arranged upstream of the processing station which may be the cutting and creasing station of a platen press.

In the processing of unprinted plate-shaped pieces traveling through the platen press, it is sufficient, though necessary to have the use of front and side stops which are arranged exactly in line with the reference points of a subsequent processing station. In this way, the piece can be quickly moved forward against the stops by the conveying device and then seized by the carrier. The front stops are then retracted and the carrier thus is enabled to pull the piece into the processing station.

If the plate-shaped piece has previously undergone one or several printing operations and if the subsequent processing operations are to be carried out in a congruent position with regard to the previous printed positions, such a positioning method becomes inadequate.

In fact, notwithstanding precautionary measures, there are frequently errors or regular deviations of the position of a process part with regard to the front and lateral edges of the sheet. For example, after successive alignments against front and side stops in different areas of the edge, which is not always dependably straight or else after alignment occurs regularly in the same area, there are often caused impressions which will subsequently lead to misalignment during subsequent alignment steps. Thus, problems always occur when die cutting of pre-printed pieces to insure a positioning of the die cut relative to the printing to obtain a finished product of the desired quality.

As outlined in the description of French Patent No. 1,470,054, an answer to this problem consists in printing on the plate-shaped piece an additional mark consisting of a black crosswise line with a specific width and arranged in the middle of a white area of a sufficient length. When the plate-shaped piece is carried through, this mark travels through an area specifically illuminated by a light source where it is scanned by five photoelectric cells arranged on a crosswise line. An electrical logic system connected to these photocells will monitor the passage of such a mark by checking the various simultaneous conditions and cause the emission of a control signal in direct relationship with the lengthwise print position. However, such a device involves numerous drawbacks. For example, it only suggests the front position with an inadequate precision on account of the width of the scanning beam of the photocells and especially this device will require a compulsory imprint of an additional mark in the middle of the sheet at an adequate spacing between the areas being process which is not always feasible when optimum utilization of the plate-shaped piece surface requires a staggered or shingled arrangement of the sheets.

SUMMARY OF THE INVENTION

The object of the present invention is to provide a solution to the above-mentioned problems by providing a device which allows for an exactly correct positioning of the front and sides of a plate-shaped piece during their passage on a feed table regardless of the initial placement of the area previously processed on these pieces. Such a device is to be able to act quickly in order to allow high production speeds. Moreover, it should be adapted to a multitude of characteristic area such as print edges or exceptionally as tiny as possible special reference marks. Such a device should be dependable, though without involving any prohibitive manufacturing costs.

These objects are obtained in an improvement of a device for positioning the plate-shaped pieces during their passage on a feed table of the machine in which the pieces are aligned against the front and side stops by means of conveying devices. The improvements are that the device includes a fixed camera covering an area of the printed figure as well as a front edge and one of the lateral edges of the piece, means connected to the camera for memorizing, for reference purposes, a reference position of a spot characteristic with regard to the front edge and one of the lateral edges of the pieces and said means comparing the position of said area on a subsequent piece with the reference values and then generating front and lateral error signals for any misalignment, electronic means converting said error signals into electrical commands to be applied to electro-mechanical means for adjusting the ultimate position of one or several of the front and side stops respectively in response to the particular error signals to correct for any misalignment.

It should be advantageous to use an electronic data processor as the means which includes a conditioning or arrangement for positioning or processing the signals received by the camera, enable the adaptance of the light intensity and/or the contrast and then digitalizing the signals followed by the modification of the enlargement rate as required. A calculation unit determines the displacement rate of the image printed on the sheet with regard to the reference value which was either memorized during the passage of the first sheet or was keyed into the memory by another method.

Preferably, the electro-mechanical means, which are designed for adjusting the position of the stops, should include a first support fitted on a crossbar underneath the feed table, a drive spindle having a cylindrical portion which is received in a ball bearing which is fitted on the support, an electrical motor fitted on the support by means of a strap and connected to said drive spindle adjacent to the cylindrical portion by means of a coupling, a stop support, an inner nut of the stop support being held on a threaded end of the drive spindle and the stop support slides along a guide rod permanently fitted or secured on the first support when the drive spindle is rotated by the motor to shift the stop support along the axis of the drive spindle. In such a case, a counter bore can be added to the stop support along the axis of the drive spindle to provide an internal shoulder which receives a spring which acts between the internal shoulder and a washer surrounding the drive spindle to press the threads of the nut of the stop support against one side of the threads of the spindle to remove or eliminate mechanical back-lash therebetween.

Depending on the constructural concept preferred, the electric motors can be either a DC motor and the command applied to it can either be voltage powered or pulsed or the drive means may be a position regulated servo-motor with the electrical command applied by means of a voltage power. In addition, the drive means may be a stepping motor with the electrical commands being applied by means of electrical pulses to the stepping motor It has appeared useful to provide the camera support with means enabling initial adjustment before locking the lateral and lengthwise position as well as the height and the angular position. Thus, the inclination of the camera with regard to the feed table can be adjusted.

The operation of the device according to the invention could then appropriately consist of moving a plate-shaped piece forward to a position underneath the visual field of the camera close to the carrier of the processing machine. Appropriately modifying the camera position or the enlargement rate of the signal processor in such a way that the front edge and one of the lateral edges of the plate-shaped piece as well as the area of the printed figure appear on the image, adjusting the light intensity and/or other parameters to obtain the desired contrast in the camera image, recording these conditions in an appropriate memory, then processing the sheet, comparing any misalignment or errors in the processed sheet relative to the printed configuration and then making the necessary various adjustments in the reference values which are in the memory of the control means.

For subsequent sheets, the camera's images will be compared to the reference values and error signals will be created for both the front stop and the lateral stop to adjust the position of the sheet until the printed image of the following sheet falls in the desired position.

Other advantages and features of the invention will be readily apparent from the following description of the preferred embodiments, the drawings and claims.

DESCRIPTION OF THE PREFERRED EMBODIMENTS

Figure 1:
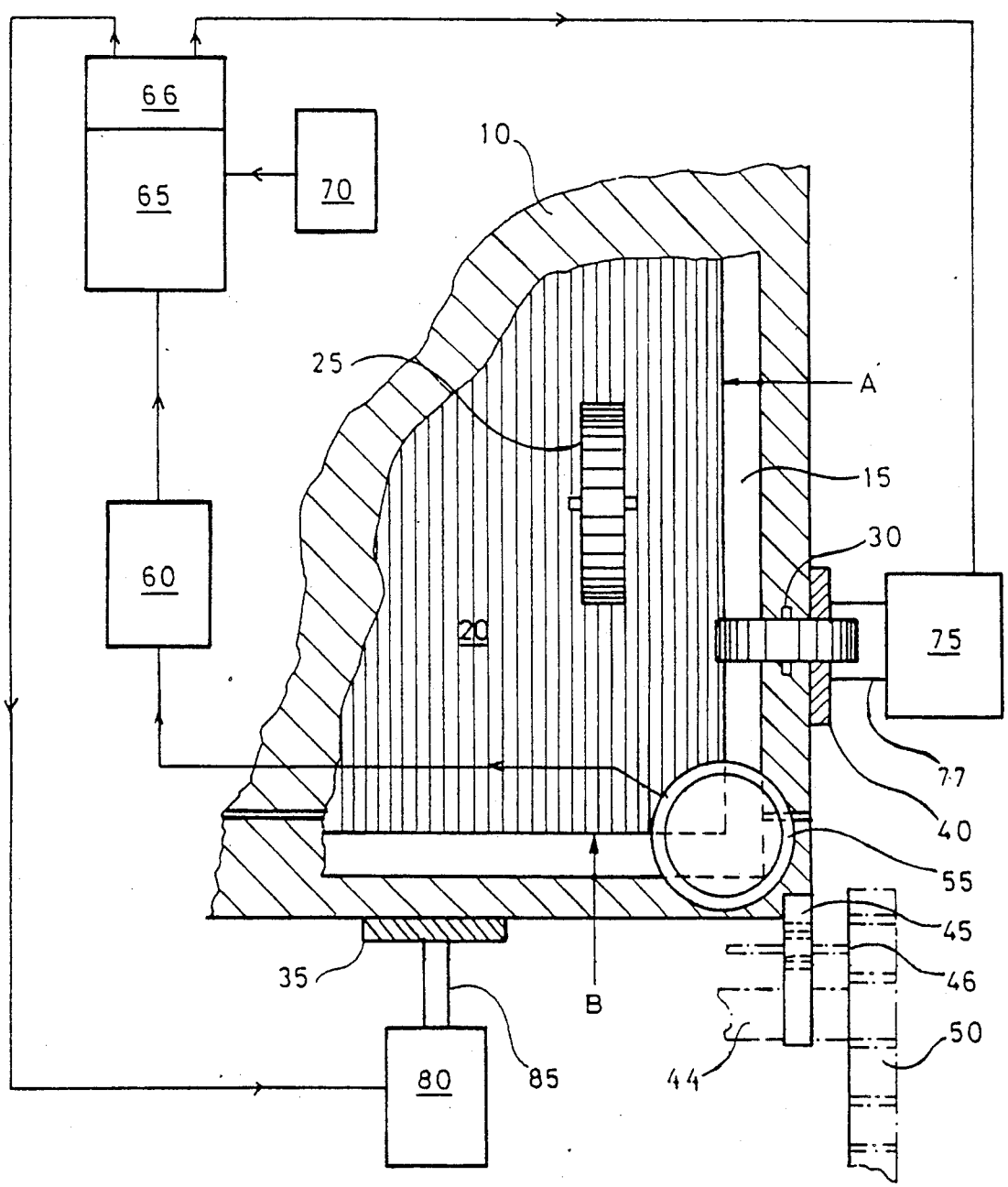
FIG. 1 is a basic schematic diagram of the device in accordance with the present invention.

The principles of the present invention are particularly useful for positioning a sheet 15 on a feed table 10 which is at the inlet of a machine for processing the plate-like pieces such as the sheet 15 which may be a paper sheet or a board. As illustrated by only a right-hand corner of the sheet, the sheet 10 has a motif or imprinted pattern 20 and is advanced along the table towards a front stop 35 by a roller 25.

When the sheet 15 has contacted the front stop 35, the sheet is then pulled laterally by a pair of rollers including an upper roller 30 towards a side stop 40. With this double alignment achieved, the two upstream sheet corners are situated somewhere between lower and upper fingers of a lateral conveyor gripper on which only a single gripper 45 is shown in FIG. 1. This lateral gripper 45 is permanently fixed on a gripper bar 44 which itself is held or mounted on an endless chain 50. Once the sheet 15 is aligned, the fingers of the conveyor gripper 45 are closed as a consequence of the movement of a control axle 46. The endless chain 50 is then operated in such a way that the grippers 45 will pull the sheet into a platen press (not illustrated) for processing.

A camera or video device 55 is vertically positioned appropriately above the feed table 10 in such a way that it is capable of scanning prior to the beginning of the alignment at both the front edge and lateral edges of the sheet 15 which in the illustrated embodiment are opposite the operator's side of the device. In addition, the camera or device 55 will also scan part of the printed pattern or motif 20. In other words, on account of its position, the camera is capable of scanning with the sheet carried forward by the roller 25 a distance A between the lateral edge of the sheet 15 and the lateral edge of the printed pattern 20 as well as a distance B between the front edge of the printed pattern 20 and a front edge of the sheet 15 which is to be aligned.

One or several successive images are transmitted in the form of electrical signals from the camera to a signal conditioner or processor 60 for preliminary processing and digitalization. A new signal is then transmitted to a calculation unit 65 and to an electronic interface 66 where specific commands for each of the electrical motors 75 and 80 are generated according to a program and to parameters which were previously recorded in a memory 70. The motor 75 is mechanically coupled at 77 to the lateral stop 40 in such a way that its rotation in one or the other directions will move the lateral stop laterally. The motor 80 is connected by a mechanical coupling 85 to the stop 35 and its rotation in one direction will shift the front stop forward while the rotation in the opposite direction will shift it in a backwards direction with respect to the direction of movement of the sheet 15 on the table 10.

Thus, it is apparent, that the signal processor 60 in combination with the calculation means or unit 65 and the memory 70, form control means for memorizing the reference positions of an area with regard to the front and side lateral edges and for comparing the position of the same area of a subsequent sheet to the memorized reference positions to create error signals. The electronic interface 66 forms an electronic means which will convert the error signals into electrical command signals for operating the motors 80 and 70 respectively.

Figure 2:
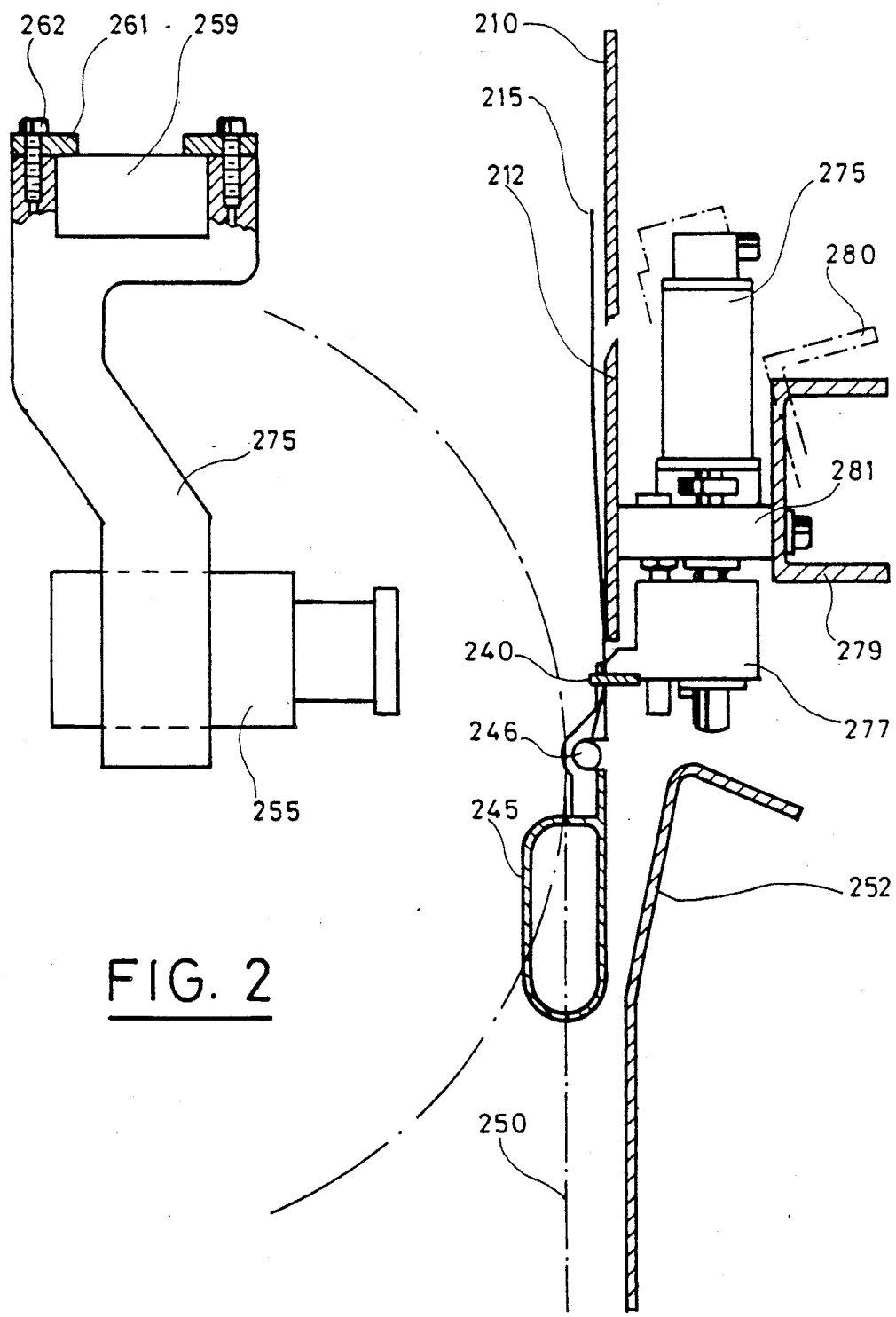
FIG. 2 is a cross-sectional view with portions in elevation to schematically illustrate the arrangement of the various components of the device at the inlet of a press.

In FIG. 2, a side view of a sheet 215 is moved along the feed table 210 to a platen press 252. After having been aligned against a front stop such as 240, the sheet 215 is seized by fingers of the gripper 245 which are actuated by a control axle or rod 246. The electromechanical assembly for actuating the front stop 240 includes the electrical motor 275, a fixed support 281 and a movable support 277 for the stop 240. This arrangement is fitted on a pivotable crossbar 279. A table 212 which is used for supporting the front part of the sheet 215 during the alignment, is fitted on the upper side of the support 281. This electro-mechanical assembly is retracted downward relative to the table 212 or to the right as illustrated in FIG. 2 by rotation of the crossbar 279 into a position illustrated in chain lines 280 shortly before the gripper 245 driven by the gripper chains 250 carry the sheet 215 into a position in the platen press 252.

A camera 255 is arranged vertically above the front edge of the tablet 212 on a brace 275. The brace is mounted on a crossbar 259 by means of two clamping bars 261 which are held by a pair of screws such as 262. After loosening the screws such as 262, the mounting arrangement can be slid along the bar 259 to slide the brace and the camera 255 in a direction along the leading edge of the sheet 212.

Figure 3:
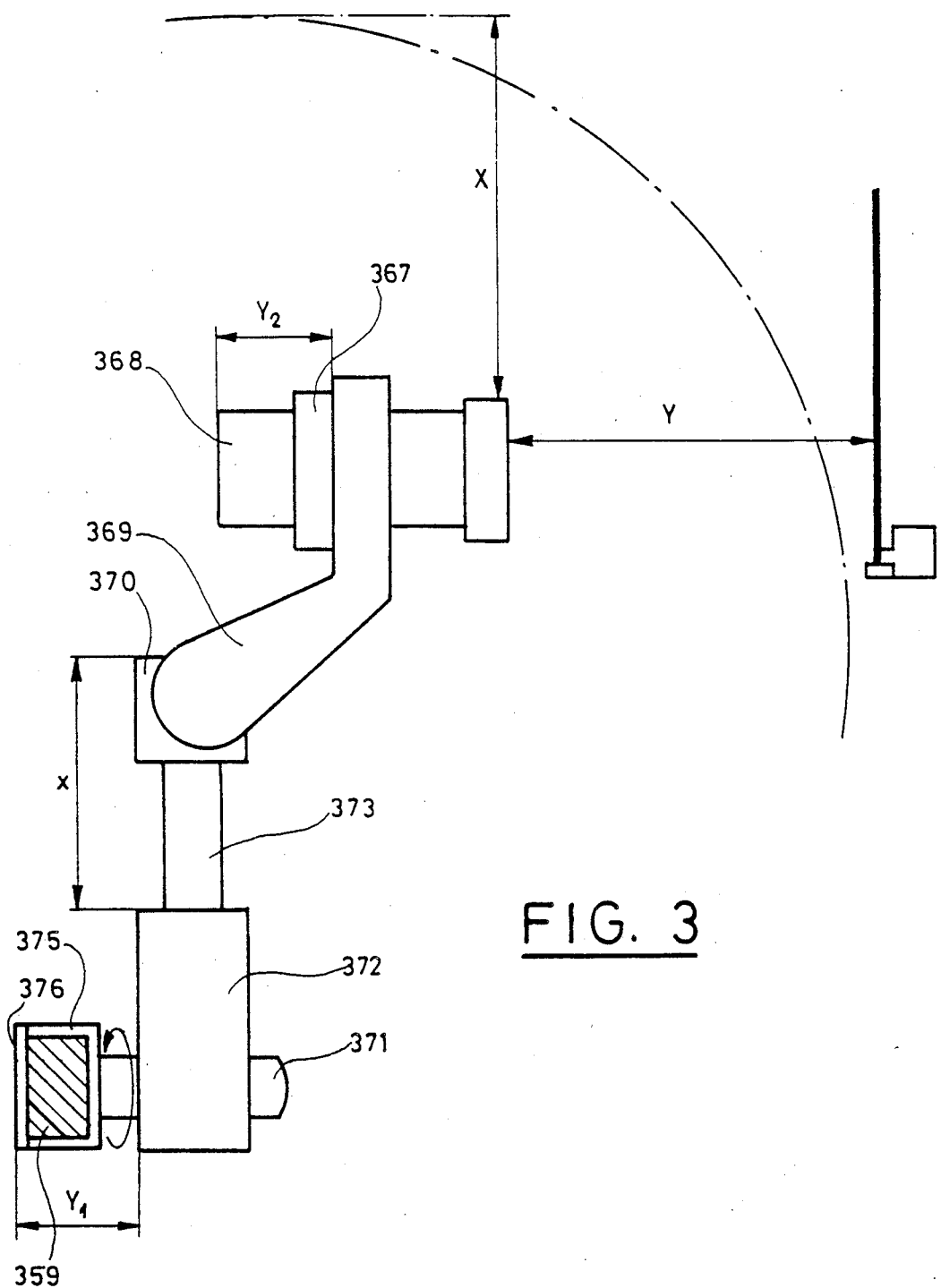
FIG. 3 is a schematic variation of a support for the camera of the present device.

A modification of the camera fixture or support is illustrated in FIG. 3 and provides a broader range for more accurate adjusting of the position as required. As previously shown, the assembly is able to slide along a crossbar such as 359 because a clamping arrangement, which comprises a bar 376 and a frame member 375, can be loosened. This frame 375 holds or provides a stud 371 which supports a frame 372 and allows the frame 372 to be pivoted thereon. The frame 372 telescopically receives an extensible bar 373 which can be moved in and out as desired. The bar 373 is linked by means of a joint 370 to one end of a brace 369. The other end of the brace 369 has a sleeve or nut 367 which receives a camera 368. This mounting arrangement makes it possible to adjust the camera height Y by either changing a distance Y1 of the position of the mount 372 relative to the crossbar 359 or by shifting the camera in the sleeve 367 through the distance of Y2. The lengthwise position X with regard to the machine can be adjusted either by pivoting the assembly around the stud 371 and/or with pulling or changing the length of the bar 373 relative to the machine frame 372.

Figure 4:
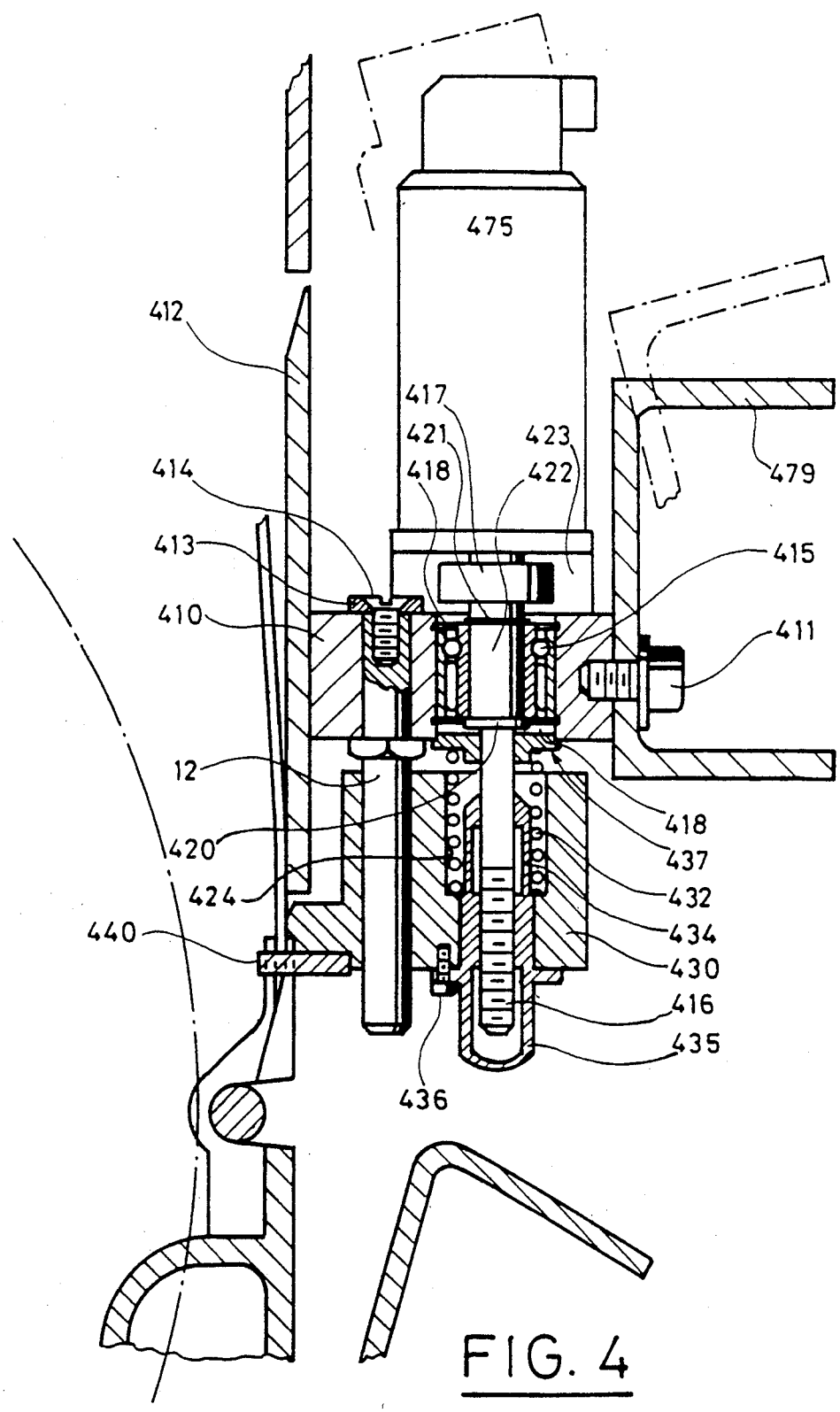
FIG. 4 is a cross-sectional view with portions in elevation of the arrangement for the movable front stop.

The electro-mechanical assembly for actuating the front stop is illustrated in more details in FIG. 4 and is similar to that illustrated in FIG. 2. It includes a fixed or first support 410, which is permanently secured on a pivoting crossbar 479 by means of screws 411. A tablet 412 is mounted on one surface of the support 410 which has a cylindrical aperture for containing or receiving a ball bearing 415 that is held in the cylindrical aperture by lateral rings 418. The ball bearing receives a cylindrical portion 422 of a drive spindle 416. The drive spindle 416 is held in place laterally with regard to the ball bearing by a collar 420 and by an appropriate retaining ring 421.

An electrical motor 475 is mounted on the support 410 by means of a strap such as 423. This motor is linked to the drive spindle 416 by a means of a coupling 417. The function of this electrical motor 475 consists in rotating the drive spindle 416 by the exact amount corresponding to the command received from the electronic means 65 and 66. To this end, the motor can be a voltage or pulse controlled DC motor, for example, a position regulated servo-motor whose response is voltage controlled or it can be a stepping motor which acts corresponding to the determined number of pulses. A front stop 440 is mounted on a movable support 430. The movable or second support 430 has a first bore with a counter bore portion 424 to form an internal shoulder. This first bore receives an internal nut 435 which has internal threads that mesh with the threads of the drive spindle 416. To prevent the nut from rotating with the drive spindle, it is anchored to the support 430 by a threaded fastener 436. To prevent the entire support 430 from rotating, a second bore is provided and extends parallel to the first-mentioned bore and receives a guiding rod 12 which is permanently mounted in the support 410 by an appropriate weld or by a screw or threaded fastener 414 holding a washer 413. Thus, when the drive spindle 416 is rotated, it will either be threaded into or out of the nut 435 to move the support 430 along the axis of the drive spindle with the direction of movement depending on which direction of rotation is occurring. At the same time, the support 430 will be sliding along the axis of the guide rod 12. Thus, the distance of the front stop 440 can be shifted relative to the front portion of the table 412.

In order to suppress or eliminate any mechanical back-lash between the threads on the drive spindle 416 and the internal threads of the nut 435, the internal nut has sleeve portion such as 434 which coacts with the counter bore portion 424 to form an internal shoulder for receiving one end of a spring 432 which surrounds the spindle 416 and has another end acting on a washer 437. The spring thus biases the nut 435 and support 430 away from the drive motor 475 to insure one surface of the threads of the nut are always engaging one surface of the threads on the spindle 416. This will, thus, annul or prevent mechanical back-lash and insure an accurate positioning of the stop 440.

Figure 5:
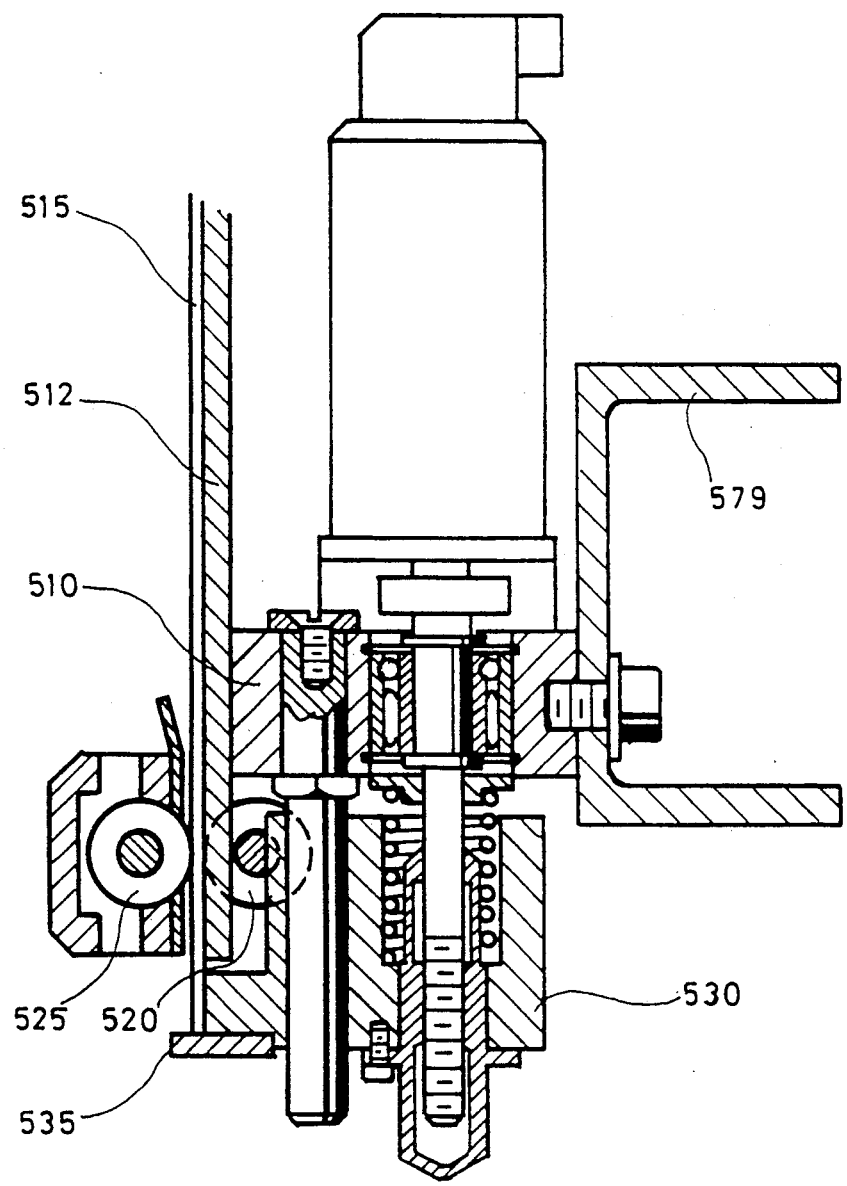
FIG. 5 is a cross-sectional view with portions in elevation of a movable side stop in accordance with the present invention.

As illustrated in FIG. 5, the electro-mechanical assembly designed for adjusting the lateral position of a lateral stop 525 is illustrated The electro-mechanical assembly is identical with the one described for FIG. 4 with the only exception being that the crossbar 579 is fixed and the support 510 is secured thereto is positioned beneath the main feed table 512. A movable support 530 for the lateral stop 535 shifts along the guide pin and the drive spindle in the same manner as the arrangement illustrated in FIG. 4. Also illustrated, are an upper pressing roller 525 which coacts with a lower pull roller 520 to shift the sheet such as 515 laterally sideways against the lateral stop 535.

As described above, the drive according to the present invention operates in the following manner: In a first stage, the operator is to decide whether he wants to use the side stops on the operator's side or on the opposite side.

In a second stage or step, the operator is to check whether there is still correct clearance between the advance cycle of the gripper 45 which is determined by the endless chains 50 and the advance of the sheet 15 which is to be positioned by the roller 25. With the checking of this spacing accomplished, the operator has the sheet moved forward to a point within the visual field of the video device or camera 55 and will then check on the screen whether the signal shape is correct. For example, whether a sufficient contrast between the black areas originating from the tablet, the white areas corresponding to the edges of the unprinted sheet 15 and the printed areas which have a grey intermediate level. If this is not the case, the operator is to either change the camera position, focus a lens, change the direction of the light beam or else the parameters of the correction carried out with the signal conditioner. Then he is to feed-in the first reference sheet from the feed table into the platen press and cause an impression on the sheet by means of the platen press.

The operator will then take the first sheet from the delivery of the press and note the positions for the die cutting and/or creasing with regard to the positions of the printed matter. Depending on the results, he will proceed by modifying the initial position of the stops moving them forward or backward by manual addressing pulses to the electrical motor such as 475. Thereafter, he will carry the reference sheet again into the press and thereby cause a memorization by electronic data processing means 65 and 66 of the rates or distances A and B which outline the print position with regard to the edges of the sheet and simultaneously check the proper platen press action.

After this stage and assuming that the press cuts coincide with the print, the press is ready for production which means that the positioning of the subsequent sheets is no longer effectuated with regard to the front and lateral edges but with regard to the print itself. A quick response of the device is insured on the one hand by the operational response of the microprocessor of the calculating unit and on the other hand by an appropriate dimensioning of the electrical motor with regard to the masses to be moved. The sheets will be shifted to insure that the edges of the printer matter lie at the desired spot regardless of the position of the edges of the sheet. Thus, the position of the stops such as 35 and 40 of FIG. 1 will be shifted to insure that the front edge and side edge of the print is at the desired position.

Since the resolution of the camera scanning and of the data processing with the means mentioned above is lower than 50 microns and the mechanical back-last has been completely eliminated with the electro-mechanical means or assembly, the misregistration of the corrected sheet depends rather on the mechanical setting of the whole machine. Examples of programs for the controlling units such as 60, 65, 66 and the memory 70 are attached herewith.

Although various minor modifications may be suggested by those versed in the art, it should be understood that I wish to embody within the scope of the patent granted hereon all such modifications which reasonably and properly come within the scope of my contribution to the art.

```
:10000600749290FF43F090FF42E4F0749290FF47A1
:10001600F090FF46E4F0752500752600752700C2AE
:1000260090C291C292752800752900752A0075B88C
:100036000175880175A88122C2AF7401120757E5C0
:1000460022900002120783A883A98290FF40E088CD
:100056008388982F00522852424D2AF22D2A8D2AF8A
:1000660090FF427401F0740112075790FF42E4F0CA
:10007600740A120757C2AFC2A822D29290FF41E07B
:100086005410600890FF45E054406002800280EC06
:100096000C290C291C29222D290118022D290D29165
:1000A600118022D2911802275220011627E017F79
:1000B60000090002E0120775900003E02FFF500148
:1000C6000E8E2C8F2D7E017F00900004E0120775A6
:1000D600900005E02FFF50010E8E2E8F2FAE2CAF15
:1000E6002D7421BE0004D39F500DAC2EAD2F74216C
:1000F600BC0009D39D4005752B008025AE2EAF2F81
:10010600AC2CAD2D1207958E368F37AE36AF3774C1
:10011600FFBE000AD39F4006E537F52B8003752BFB
:10012600FFE52264046002D20222E5242524F52498
:100136002A20040034753901753800AE38AF39ACAB
:1001460032AD33EDC39FEC9E401D740690FF42F026
:10015600313090FF42E4F031307839740126F650A0
:100166000418E436F650D48032753901753800AE7D
:1001760038AF39AC32AD33EDC39FEC9E401D7418D9
:1001860090FF42F0313090FF42E4F031307839741C
:100196000126F6500418E436F650D422900000E00A
```

```
:1001A600FEA3E0FFAC30AD31EFD39DEE9C4017D2FD
:1001B60000900000E0FEA3E0FFAC30AD31120795E1
:1001C6008E328F338015C200AE30AF31900000E022
:1001D600FCA3E0FD1207958E328F33AE32AF337437
:1001E600471207758E328F33AE32AF337402120761
:1001F600678E328F33E5334532600231379000027
:10020600E530F0A3E531F085242422E5242524F504
:100216002422511190FF42E4F0511122753A00E573
:100226003AD394C7501890FF45E05404600874040C
:1002360090FF42F05118783A740126F650E1227583
:100246003B00E53BD394C7501890FF45E054086047
:1002560008741090FF42F05118783B740126F6504E
:10026600E122753C00E53CD394C7501890FF45E069
:10027600540160087402990FF42F05118783C7401F2
:1002860026F650E122753D00E53DD394C7501890FF
:1002960045E054026008740890FF42F051187858
:1002A6003D740126F650E12290FF41E0F53EE53E21
:1002B600542060230526E526B4021AE53E5408605C
:1002C600025122E53E540460025168E53E540C702A
:1002D60004512251688027E53E544060230525E5F0
:1002E60025B4021AE53E540860025145E53E540421
:1002F6006002518BE53E540C70045145518B8006CB
:10030600752500752600227753F00D203E53FC3958B
:10031600215006A203B3B340028048E53F90001285
:100326001207833E53F04FEE0FFEE900012120783FA
:10033600EFFEE0FFEEC39FC394024021E53F049029
:1003460000012120783E53FFEE0FFEE90001212074F
:1003560083EFFEE0FFEEC39FC394025002C2030583
:100366003F80A9E53F900012120783E022E521B401
:100376000126900012E0F543754200AE42AF437489
:10038600041207758E428F4390FF45E05480600447
:10039600C2038002D203A139752300D203E523C329
:1003A600952150065A203B3B340028048E52390008E
:1003B60012120783E52304FEE0FFEE9000121207F7
:1003C60083EFFEE0FFEEC39FC394034021E52304C1
:1003D600900012120783E523FEE0FFEE9000121252
:1003E6000783EFFEE0FFEEC39FC394035002C203F0
:1003F600052380A91523A2035002A136E523900008
:1004060012120783E0F543754200E52304900012BB
:100416000120783E0F541754000AE42AF43AC40ADF4
:100426004lEF2DFDEE3CFC8C428D43E523240 2C3B7
:10043600952140 02A11EE5230490001212 0783E5D0
:1004460023FEE0FFEE900014120783EFFEE0FFEEBE
:10045600C39FC394034021E52390001412 0783E54C
:100466002304FEE0FFEE900012120783EFFEE0FF8A
:10047600EEC39FC394035042E523049000121207733
:1004860083E523FEE0FFEE900015120783EFFEE002
:10049600FFEEC39FC394034023E523900015120784
:1004A60083E52304FEE0FFEE900012120783EFFEC1
:1004B600E0FFEEC39FC3940340028042E523900011
:1004C600014120783E0F541754000AE42AF43AC40DD
:1004D600AD41EF2DFDEE3CFC8C428D43E5239000B3
:1004E600015120783E0F541754000AE42AF43AC40BC
:1004F600AD41EF2DFDEE3CFC8C428D4380188542CC
:1005060040854341AE42AF43AC40AD41EF2DFDEED9
:100516003CFC8C428D438018854240854341AE4267
:1005260 0AF43AC40AD41EF2DFDEE3CFC8C428D431C
:10053600852424AE42AF4322C2AFC202C290C2910A
:10054600C292752100E521D394135013E521900042
```

:1005560012120 78374AAF0782174 0126F650E67504
:10056600210090FF41E05402700B90FF41E05410CF
:10057600070012280ED90FF467401F090FF46E4F092
:1005860090FF41E054026007E521C39414400280C5
:100596002C11AEE52BD394304007E52BC394804055
:1005A600028018E521900012120783E52BF0052141
:1005B600740290FF46F090FF46E4F080C3A202B3B7
:1005C6004004119D8031E521C394015004 11A98096
:1005D6002671738E308F31A203B3400411A28017A7
:1005E600A201B3400E900000E530F0A3E531F0C261
:1005F60001800431A251AED2AF22754601E546D341
:1006060094065 00D74641207577846740126F65006
:100616 00EC22511190FF42E4F05111D201227547AC
:1006260000E547D394C7501890FF45E0540460088E
:1006360074049 0FF42F0D1187847740126F650E111
:100646 0022754800E548D394C7501890FF45E054FA
:10065600086008741090FF42F0D118784874 01269B
:10066600F650E122754900E549D394C7501890FF2A
:10067600 45E054016008740290FF42F0D1187849B1
:1006860074 0126F650E122754A00E54AD394C75014
:1006960 01890FF45E054026008740890FF42F0D1BC
:1006A60018784A740126F650E122C2AF1106752762
:1006B60000075350007528 0075290 0752A00C201905D
:1006C600FF41E0547CF534E5346535600575270057
:1006D600805FE53454106004B13E8055C2AFD1004E
:1006E6 00527E52764026007E527D394124042E513
:1006F600345 4206 01CE53454086002D124E5345497
:100706 00046002D16AE534540C7004D124D16A80A5
:100716 0020E5345440601AE53454086002D147E5B8
:10072600 03454046002D18DE534540C7004D147D1A1
:060736008D853435808939
:090783002582F582500205832253
:08079500C3EF9DFFEE9CFE2264
:10076700048007C3CE13CECF13CFD5E0F622F88F80
:0C077700F0A4FFE5F0CE88F0A42EFE22D6
:10075700600D782B020761007830D8FED5E0F822CB
:0300030002073CB5
:0300000002078C68
:09078C0075814B75D0180206B00E
:10073C00C0E0C0F0C083C082C0D075D00012003EB3
:0B074C00D0D0D082D083D0F0D0E032BB
:00000001FF

I claim:

1. In a device for positioning plate-shaped pieces traveling over a feed table at an entrance of a processing machine, said table having means comprising a front stop and a side stop coacting with means for conveying a piece against the stops to align the piece prior to it being fed into a carrier for the subsequent processing machine, the improvements comprising said device including a fixed camera for visualizing a portion of a printed figure on the piece as well as a front edge and one of the lateral edges of the piece, control means being connected to the camera for memorizing reference positions of said printed area with regard to the front edge and one of the lateral edges of the piece and for comparing the position of the same printed area of a subsequent piece to the memorized reference with a view of generating front and lateral error signals for any misregistration; an electronic means for converting said error signals into electrical commands which are directed to electro-mechanical means for adjusting the ultimate position of each of the front and side stops respectively.

2. In a device according to claim 1, wherein the control means includes a conditioner means for treating the signal from the camera to enable a correction of the light intensity and/or contrast, said conditioner means then digitalizing the signal, and a calculating unit for determining the amount of misregistration with regard to the reference position of a specific area of the piece, said reference position being entered by selectively memorizing the points during passage of a first piece and through an operator controlled keyboard.

3. In a device according to claim 1, wherein each electro-mechanical means includes a first support secured on a crossbar beneath a feed table, a drive spindle having threads being mounted for rotation in said support, an electrical motor fitted on the support and connected to the end of the drive spindle, a movable support connected to the stop, said movable support being connected to a nut threadably received on a portion of the drive spindle, a guide rod mounted in the first mentioned support and slidably received in a bore of said second movable support so that the movable support moves along the axis of the drive spindle in response to rotation of the drive spindle by said motor.

4. In a device according to claim 3, wherein the nut of the movable support is mounted in a second bore extending parallel to the shaft of said drive spindle and the first mentioned bore, said bore being provided with an internal shoulder receiving one end of a compression spring having the other end acting against the first support to bias the movable support against one side of the threads on said drive spindle.

5. In a device according to claim 3, wherein the electric motor is a DC motor and the command signals include pulses.

6. In a device according to claim 1, which includes a camera support means for supporting the camera in a position above the feed table.

7. In a device according to claim 6, wherein said camera support means includes means enabling adjustment in a lateral direction for the camera with regard to the direction of feed.

8. In a device according to claim 6, wherein the camera support means includes means enabling adjustment of the camera in a longitudinal direction of feed of the piece on the feed table.

9. A device according to claim 6, wherein the camera support means includes means enabling adjustment in both a longitudinal and a lateral direction and also enables tilting the axis of the camera.

10. A method for setting up a device for aligning a sheet of material having printed matter with the printed material being aligned with a subsequent processing device, said method including providing a feed table having a camera fixed for visualizing portions of a printed area on a sheet being moved into alignment relative to a front edge stop and a lateral edge stop; moving the sheet forward until it will be situated underneath a visual area of the camera and close to a carrier for moving it into the processing device; appropriately modifying the camera position, the enlargement rate of the lens in a way to insure proper contrast between the printed areas on the sheet, the unprinted areas between the printed areas and the edges, and the table uncovered by the sheet; locking in these settings; modifying appropriately the parameters of the corrections for the light intensity and/or contrast and digital enlargement rates of a signal processing device; and then running the sheet at a low speed through the device and recording the various reference values in a control means for the device for subsequent use in determining error signals for positioning subsequent sheets.

* * * * *